3,701,722
PREPARATION OF α-HALOKETONES USING
ULTRAVIOLET LIGHT
David C. Heckert, Oxford, Ohio, assignor to The Procter
& Gamble Company, Cincinnati, Ohio
No Drawing. Filed June 16, 1971, Ser. No. 153,845
Int. Cl. B01j 1/10
U.S. Cl. 204—162 R                              13 Claims

ABSTRACT OF THE DISCLOSURE

A process for preparing α-haloketones from olefins, oxygen, and a hydrogen halide using a metal salt catalyst and ultraviolet light. Such haloketones are useful as intermediates in the preparation of fabric softening and surfactant compounds.

BACKGROUND OF THE INVENTION

The present invention relates to the preparation of α-haloketones which are important precursor materials in the preparation of keto quaternary ammonium salt fabric softeners and keto amine oxide surfactants.

The preparation of α-haloketones from olefins, hydrogen halides and oxygen provides the most economical route to this class of materials since all of the starting materials are inexpensive. However, as is well-known in the art, the addition of the elements of hydrogen halide to an olefinic double bond usually results in the formation of the saturated alkyl halide rather than the desired chloroketone. The addition of hydrogen halide to olefins in the presence of oxygen has been attempted with the thought that both the elements of oxygen and halogen could thereby be incorporated at the olefinic double bond to provide the desired haloketones. Such attempts have met with only limited success in that oxygen apparently interacts with the hydrogen halide to yield the free halogen which, in turn, adds to the olefinic bond to provide primarily vicinal dihalides rather than the desired α-haloketones.

Because of the aforementioned difficulties with the preparation of α-haloketones using olefins, oxygen and hydrogen halides, a variety of other methods have been suggested. For example, A. I. Kryukov, et al., Dokl. Akad. Nauk. SSSR, 1968 179 (6), 1340–3, disclose that solutions of iron(III) chloride and olefins in acetic acid can be induced to combine with oxygen in the presence of ultraviolet light to give minor amounts of α-chloroketones and major amounts of vicinal dichlorides. U.S. Pat. 3,106,579 (Oct. 28, 1958) to Horning et al., relates to the oxidation of olefins using iron chloride, hydrochloric acid and oxygen. U.S. Pat. 3,119,874 (Nov. 29, 1958) to Paszthory et. al., discloses that hydrophilic solvents are useful in the oxidation of olefins to form ketones. Each of the aforementioned processes suffers from a similar disadvantage, i.e., the chloroketones are formed only in minor amounts whereas vicinal dihalides are the major products. This difficulty is overcome by the present process wherein olefins are converted to α-haloketones in major proportions by the action of hydrogen halides and oxygen.

Accordingly, it is an object of this invention to provide an improved process for preparing α-haloketones from olefins. It is a further object to provide a catalytic process for the preparation of α-haloketones wherein said haloketones are a major proportion of the reaction products. These and other objects are obtained by this invention as will be seen from the following disclosure.

SUMMARY OF THE INVENTION

The present invention encompasses a process for preparing α-haloketones comprising co-dissolving a hydrogen halide selected from the group consisting of hydrogen chloride and hydrogen bromide, an olefin, oxygen, and a catalytic amount of a metal salt having ligands whose bond strengths with the metal cation are not greater than that of chloride ion and whose cation has an ultraviolet absorption spectrum in the wavelength from about 2700 A. to about 4500 A. in an organic solvent. The reaction mixture is irradiated with ultraviolet light having a wavelength from about 2700 A. to about 4500 A. and the desired α-haloketones are formed in major proportions.

DETAILED DESCRIPTION OF THE INVENTION

The olefins used in the present process are of the general formula RCH=CHR, wherein each R is hydrogen, alkyl, substituted alkyl, aryl and substituted aryl as well as cyclic olefins of the formula

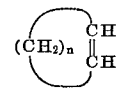

wherein $n$ is an integer greater than 1. Since the reaction leading to the formation of α-haloketones by the process disclosed herein occurs exclusively across the double bond of the olefin, the nature of the groups R has no substantial effect thereon and any type of olefin is suitable for use herein. For example, olefins having one or both groups R as $C_1$ to $C_{20}$ alkyl, $C_5$ to $C_{24}$ aryl, and substituted alkyl, aryl and alkaryl groups are suitable herein. Olefins wherein one group R is alkyl and the other is aryl are also suitable. The following exemplary olefins can all be used herein and are converted to the corresponding α-haloketones in high yields by the present process: cyclopentene, cyclohexene, cyclooctene, cyclododecene, cycloeicosene, 1-pentene, 2-pentene, 1-hexene, 2-hexene, 1-heptene, 2-heptene, 3-heptene, 1-octene, 2-octene, 3-octene, 1-nonene, 2-nonene, 3-nonene, 4-nonene, 1-dodecene, 2-dodecene, 3-dodecene, 4-dodecene, 5-dodecene, 1-hexcosene, 2-hexcosene, 3-docosene, 1-heneicosene, 1,1,2,2-tetraeicosylethene, 1,1,2,2-tetrakis-heneicosylethene, 2-methyl-1-pentene, 3-ethyl-3-hexene and 3-ethyl-4-dodecene.

Terminal olefins of the formula $RCH=CH_2$, wherein R is as above, are preferred for use herein. The olefins 1-hexene and 1-decene are especially preferred in the present process.

The hydrogen halide used herein can be either hydrogen chloride or hydrogen bromide; hydrogen chloride is preferred for economic reasons. When hydrogen chloride is used, α-chloroketones are formed; hydrogen bromide yields α-bromoketones. The hydrogen halides used herein can be added to the reaction mixture as aqueous solutions, i.e., as hydrochloric acid and hydrobromic acid. Alternatively, and more preferred, the hydrogen bromide and hydrogen chloride are added to the reaction mixtures used herein as gases by simply bubbling said gases through the reaction mixture. When gaseous hydrogen halides are added to the reaction mixtures the rate of addition need not be precisely controlled in that α-haloketones are formed in good yields at various addition rates. It will be recognized that the power output of the irradiating light source limits the rate at which the formation of α-haloketones are formed. Thus, if the hydrogen halide is added at too rapid a rate with a low power light source, much of the hydrogen halide will not be utilized and will be lost. If the rate of addition is too slow, light energy will be wasted. Preferably, the hydrogen halides are added to the reaction mixtures herein at a rate from about 0.028 moles hydrogen halide/mole olefin/minute to about 0.114 mole hydrogen halide/mole olefin/minute for each 450 watts of power of the light source.

Oxygen is employed in the process herein and can be added either in the form of air or as pure oxygen gas by bubbling through the reaction mixture. More conveniently, the air or oxygen is mixed with the gaseous hydrogen halide and added to the reaction mixture simultaneously therewith. The rate of oxygen addition herein is not critical to the products formed. Preferably, oxygen is added to the reaction mixtures herein at about the same rate that the hydrogen halide gas is added. When air is used it should be bubbled through the reaction mixture at a rate about five times that when pure oxygen is used, to provide for dilution.

An organic solvent which is suitable for dissolving the olefin, hydrogen halide, oxygen and metal salt is employed in the present process. The organic liquid solvents suitable for use herein should not coordinate strongly with the cation of the metal salt catalyst. For this reason, liquid amines and liquid nitro compounds, while usable herein, are not preferred. Likewise, saturated hydrocarbons suffer from the disadvantage that the hydrogen halides and oxygen are only very slightly soluble therein and the reaction rate of the present process is slowed because of the decreased reactant concentration. For most purposes, polar and polarizable organic liquids such as the liquid aromatics, e.g., benzene and substituted benzenes, liquid organic acids, nitriles, esters, aldehydes, and ketones are preferred herein because of their solubilizing properties for the reactants used in the present process. For example, benzene, toluene, acetonitrile, and ethyl acetate, are all suitable solvents in the preparation of α-haloketones herein.

While any of the foregoing organic solvents can be suitably employed in the present invention to provide α-haloketones from olefins, liquid ketones are especially preferred herein. As will be seen hereinafter, the use of ketone solvents in the present process leads to a marked and unexpected increase in the formation of α-haloketones from olefins by this process. Any liquid ketone is suitable for use as a preferred solvent herein. For example, acetone, methylethyl ketone, dipropyl ketone, dibutyl ketone, methylphenyl ketone, ethylpropyl ketone, and the like are all suitable for this solvent purpose. Acetone is especially preferred as the solvent herein both from a cost standpoint and by virtue of the high yields of α-haloketones when acetone is used as the solvent.

A metal salt is used in a catalytic amount in the reaction mixtures employed herein. The metal salts usable herein are those whose cations have an ultraviolet absorption spectrum in the wavelength from about 2700 A. to about 4500 A. and include salts of iron(III), iron(II), copper(II), copper(I), zinc(II), titanium (III), chromium(II), and the like. Iron(III), iron(II), copper(II), and copper(I), salts are preferred herein.

While not intending to be restricted by theory, it is hypothesized that the function of the metal salt catalyst is to provide both an intermediate source of halide ion and a means by which a peroxide intermediate transfers an oxygen atom to the olefinic double bond, thereby resulting in the addition of both oxygen and halogen to said bond and the formation of the α-haloketones. The metal salt is then reconverted to a metal-halogen-oxygen intermediate by the addition of additional oxygen, hydrogen halide and light energy to the reaction mixture and the process is repeated until all the olefin is converted to α-haloketone. Since it is necessary that the metal salt be able to form an intermediate metal halide by reaction with the hydrogen halide, the ligand (i.e., anion) of the salt employed should not bond with the metal cation more strongly than does chloride ion. For example, metal salts comprising a metal cation of the types hereinbefore disclosed in combination with a multidentate ligand are of marginal use herein. Metal chlorides, bromides and iodides whose cations have the appropriate ultraviolet absorption spectrum hereinbefore noted are preferred herein. Metal perchlorates and perbromates are also suitable. Exemplary metal salts which are useful herein include iron(III) chloride, iron(III) bromide, iron(III) perchlorate, iron(II) chloride, iron(II) bromide, titanium(III) chloride, titanium(III) perbromate, copper(II) chloride, copper(II) bromide, copper(I) perchlorate, and the like. Especially preferred herein are iron(III) chloride, iron(II) chloride, copper(II) chloride and copper(I) chloride. These salts are available in both the hydrated and anhydrous form; the anhydrous form is the more preferred. Especially preferred herein is anhydrous iron(III) chloride.

The metal salt is employed herein in a catalytic amount, i.e., from about 0.001 mole to about 0.1 mole of metal salt per mole of olefin in the reaction mixture. A concentration from about 0.05 mole to about 0.10 mole of metal salt per mole of olefin is preferred.

The process herein is catalyzed by ultraviolet light of a wavelength from about 2700 A. to about 4500 A., more preferably from about 2700 A. to about 3500 A. The light sources used herein to provide the ultraviolet irradiation include sunlight and commercially available high-pressure mercury arc lamps having a total power capacity ranging from about 50 watts to about 10,000 watts, preferably from about 100 watts to about 600 watts. Also useful herein are the commercially available low-pressure mercury lamps having a total power capacity from about 0.5 watt to about 50 watts, preferably from about 0.5 watt to about 2 watts. These lamps generally emit wavelengths of about 2537 A., but, with the addition of phosphors, can be made to emit wavelengths of 3000 A. and 3550 A., for example. The reaction vessels used herein can be of two types. In the one type, the vessel is made of quartz, Vycor, Corex, or Pyrex, any of which will transmit ultraviolet radiation from the high pressure lamps disclosed above to the reaction mixture to catalyze the formation of the α-haloketones. Pyrex reaction vessels, however, should not be used when low-pressure mercury lamps are used herein since pyrex tends to filter out wavelengths below 2800 A. Alternatively, the reactions can be carried out in ultraviolet opaque vessels by immersing or suspending ultraviolet light sources of the aforementioned type therein. The choice of reaction vessels, light sources and the like can be guided by standard technology well-known to those skilled in the art.

The preparation of α-haloketones by the present process is most generally carried out as follows. The olefin and metal salt are dissolved in the organic solvent with stirring. Following this, oxygen and the hydrogen halide are bubbled through the reaction mixture while said mixture is simultaneously irradiated with ultraviolet light. While the reaction temperature is not critical to the formation of the α-haloketone product, a preferred temperature range used herein is from about 0° C. to about 100° C., more preferably from about 0° C. to about 56° C. In some instances, the reaction mixture is cooled (ice bath) to maintain the temperature within this range since the ultraviolet light source heats the mixture to some extent. The time of the reaction is not critical in that formation of the α-haloketone begins immediately. It will be recognized that the reaction time will depend on various factors such as the rate of addition of hydrogen halide and oxygen, the concentration of olefin, and the like. For most purposes, a reaction time from about 10 minutes to about 4 hours per mole of olefin being converted to α-haloketone will suffice. The reaction mixture can be monitored periodically (infrared spectrum of C=C stretching frequency) to determine the extent of completion of the reaction.

The following examples are intended to further demonstrate the process of this invention but are not intended to be limiting thereof. In the examples the irradiation products were analyzed by gas chromatography on an Aerograph 202B gas chromatograph using a Carbowax 20M or silicone rubber column. Individual components of the product mixtures were isolated by distillation or preparative gas chromatography and were analyzed by infrared and nuclear magnetic resonance spectroscopy and elemental analysis. Gas flows were measured by calibrated Brooks rotometers.

EXAMPLE I

Anhydrous iron(III) chloride (1.33 g.) was dissolved in 200 ml. of dry acetone. To this solution was added 13.3 ml. of 1-decene and the mixture was placed in an irradiation vessel [described in P.J. Kropp and W. F. Erman, J. Amer. Chem. Soc. 85 2456 (1963)] and irradiated through a Pyrex sleeve with a Hanovia 450 watt high pressure mercury arc lamp (2700 A. to 4500 A.) at about 50° C. During the irradiation, a mixture of oxygen (350 ml./min., i.e., 0.22 mole/min./mole of olefin) and anhydrous HCl (4 mmole/min., i.e., 0.057 mole/min./mole of olefin) was bubbled into the base of the vessel through a sintered glass disc. After 4 hours of irradiation the mixture was analyzed by gas chromatography. The reaction product comprised 71.2% of 1-chloro-2-decanone, 3.0% of 1-chloro-2-decanol, and 3.0% of 1,2-dichlorodecane.

In the above procedure the acetone is replaced by an equivalent volume of dibutyl ketone, diethyl ketone, phenylmethyl ketone, diphenyl ketone and methyldecyl ketone, respectively, and equivalent results are secured in that the 1-decene is converted to 1-chloro-2-decanone in major proportions.

In the above procedure, the anhydrous HCl gas is replaced by an equivalent volume of anhydrous HBr gas added at the same rate, and 1-bromo-2-decanone is secured in major proportions.

In the above procedure, the iron(III) chloride is replaced by an equavalent amount of iron(II) chloride, copper(II) chloride and copper(I) chloride, respectively, and equivalent results are secured in that 1-chloro-2-decanone is formed in major proportions.

EXAMPLE II 1.33 g. of anhydrous iron(III) chloride was dissolved in 200 ml. of dry acetone. To this solution was added 13.3 ml. of 1-decene and the mixture was placed in an irradiation vessel and irradiated in the manner of Example I, above. During irradiation, a mixture of oxygen (350 ml./min., i.e., 0.22 mole/min./mole of olefin) and anhydrous HCl gas (at a rate of 2 mmole/min.; 0.028 mole/min./mole of olefin) was bubbled through the reaction mixture during the entire irradiation period. After four hours of irradiation the mixture was analyzed by gas chromatography and proved to be 31.2% 1-chloro-2-decanone, 8.1% 1-chloro-2-decanol and 0.8% 1,2-dichlorodecane (yield based on starting olefin).

In the above procedure the 1-decene is replaced by an equivalent amount of 1-propene, cyclohexene, 1-eicosene, 5-decene, 3-ethyl-1-decene, 5-bromo-1-tetradecene, and styrene, respectively, and equivalent results are secured in that 1-chloro-2-propanone, 1-chloro-6-cyclohexanone, 1-chloro-2-eicosanone, 5-chloro - 6 - decanone, 1-chloro-3-ethyl-2- decanone, 1-chloro-5-bromo-2-tetradecanone and 1-chloro-2-phenyl-2-ethanone, respectively, are secured in major proportions.

In the above procedure, ultraviolet irradiation having a wavelength in the range from 2700 A. to 3500 A. is used and the irradiation time is shortened from 4 hours to about 3 hours and equivalent product yields are secured.

The irradiation is carried out at temperatures of 0° C., 56° C. and at 100° C., (using a pressure vessel), respectively, and equivalent results are secured.

EXAMPLE III

Following the procedure of Example I, above, 1.33 g. of anhydrous iron(III) chloride and 200 ml. of dry acetone containing 10 ml. (7.44 g.) of 1-decene was irradiated with ultraviolet light of a wavelength in the range of 2700 A. to 4500 A. at about 50° C. while concurrently adding a mixture of dry hydrogen chloride gas and oxygen at a rate of 8 mmoles/min. (0.114 moles/min./mole olefin) of HCl and 350 ml./min. (0.22 moles/min./mole olefin) of oxygen during the irradiation. The irradiation and gas addition was carried out over four hours. Following this, the products were separated and analyzed by gas chromatography and found to be 47.8% 1-chloro-2-decanone, 3.2% 1-chloro-2-decanol and 4.1% 1,2-dichlorodecane (yield based on starting olefin).

The above procedure is carried out using iron(III), chloride:olefin ratios of 0.001:1, 0.05:1 and 0.1:1, respectively, and equivalent results are secured.

In the above procedure, the acetone is replaced by an equivalent volume of benzene, ethyl acetate and propionaldehyde, respectively, and 1-chloro-2-decanone is formed.

The above process is carried out for periods of ten minutes, one hour and two hours, respectively, and the irradiation products prove to be predominantly 1-chloro-2 - decanone. Similar results are achieved when the iron(III) chloride is replaced by an equivalent amount of titanium(III) chloride, zinc(II) bromide, iron(II) perchlorate, iron(III) bromide, hydrated iron(III) chloride, and chromium(II) iodide, respectively.

EXAMPLE IV

One mole of 1-chloro-2-decanone, as prepared in Example III, above, is dissolved in diethyl ether. One mole of trimethylamine is added to the ether solution, with stirring, and a precipitate of 1-trimethylammonium-2-decanone chloride is formed; this is recovered by filtration. The 1-trimethylammonium-2-decanone chloride is applied to fabrics from a laundry rinse and substantially improves their softness and handle and reduces static charge build-up.

What is claimed is:

1. A process for preparing α-haloketones comprising codissolving a hydrogen halide selected from the group consisting of hydrogen chloride and hydrogen bromide, an olefin, oxygen, and a catalytic amount of a metal salt having ligands whose bond strengths with the metal cation are no greater than that of chloride ion and whose cation has an ultraviolet absorption spectrum in the wavelength from about 2700 A. to about 4500 A. in an organic solvent and irradiating the solution with light having a wavelength from about 2700 A. to about 4500 A.

2. A process according to claim 1 wherein the organic solvent is a ketone.

3. A process according to claim 1 wherein the organic solvent is acetone.

4. A process according to claim 1 wherein the hydrogen halide is hydrogen chloride gas.

5. A process according to claim 1 wherein the metal salt is selected from the group consisting of metal chlorides, metal bromides and metal iodides.

6. A process according to claim 1 wherein the olefin is a terminal olefin of the formula RCH=CH$_2$, wherein R is alkyl, substituted alkyl, aryl and substituted aryl.

7. A process according to claim 1 wherein the olefin is selected from the group consisting of 1-hexene and 1-decene.

8. A process according to claim 1 which is carried out at a temperature from about 0° C. to about 56° C.

9. A process according to claim 1 wherein the metal salt is selected from the group consisting of iron(III)

chloride, iron(II) chloride, copper(I) chloride and copper(II) chloride.

10. A process according to claim 1 wherein the metal salt is anhydrous iron(III) chloride.

11. A process according to claim 1 wherein the metal salt is anhydrous iron(III) chloride and the organic solvent is acetone.

12. A process according to claim 1 wherein the olefin is 1-decene, the organic solvent is acetone, the hydrogen halide is hydrogen chloride gas and the metal salt is anhydrous iron(III) chloride.

13. A process according to claim 1 wherein the light has a wavelength from about 2700 A. to about 3500 A.

References Cited
UNITED STATES PATENTS

| | | | |
|---|---|---|---|
| 3,106,579 | 10/1958 | Horning et al. | 260—586 B |
| 3,119,874 | 11/1958 | Paszthory | 260—597 R |

OTHER REFERENCES

"Organic Photochemistry," edited by Orville L. Chapman (1967), Marcel Dekker, Inc., N.Y., vol. 1, pp. 201, 202, 236 and 237.

BENJAMIN R. PADGETT, Primary Examiner

U.S. Cl. X.R.

204—158 R, 163 R